May 1, 1934.   F. ALTMAYER ET AL   1,956,968
BATTERY FILLER
Filed Oct. 29, 1932   2 Sheets-Sheet 1
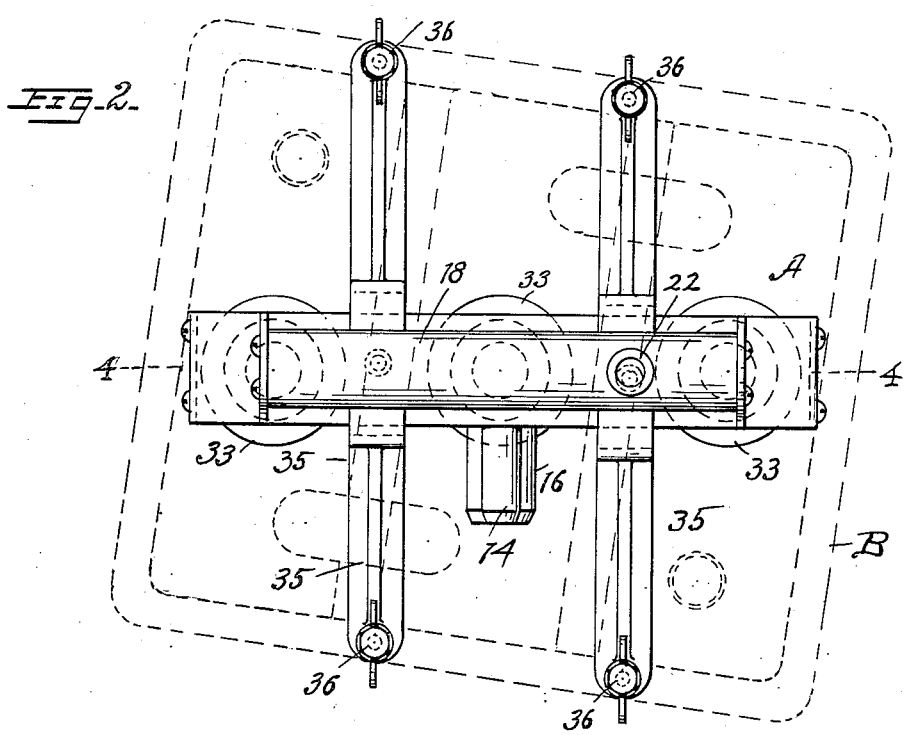
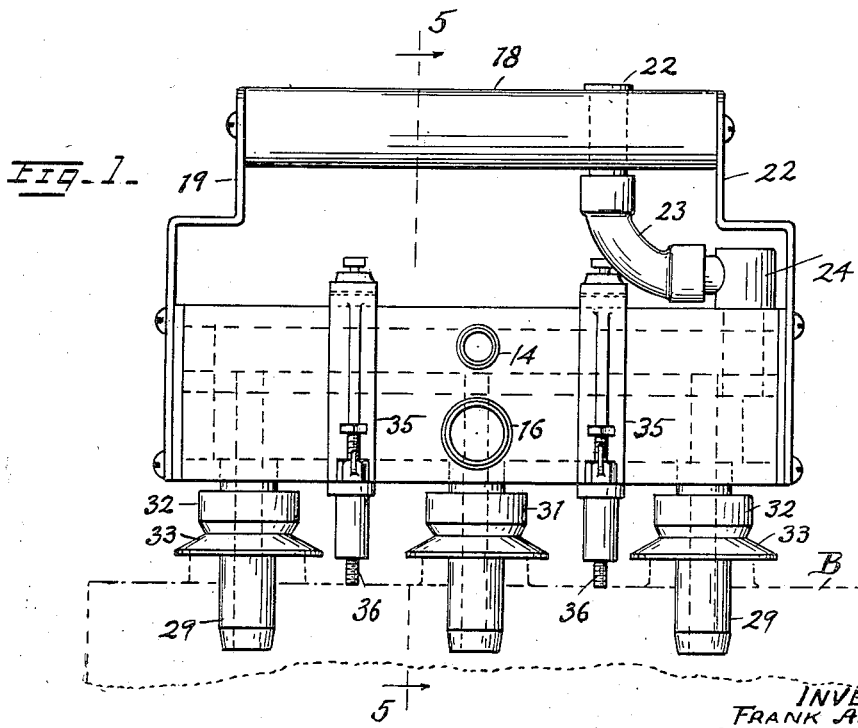
INVENTOR
FRANK ALTMAYER
ARTHUR O. CODNEY.

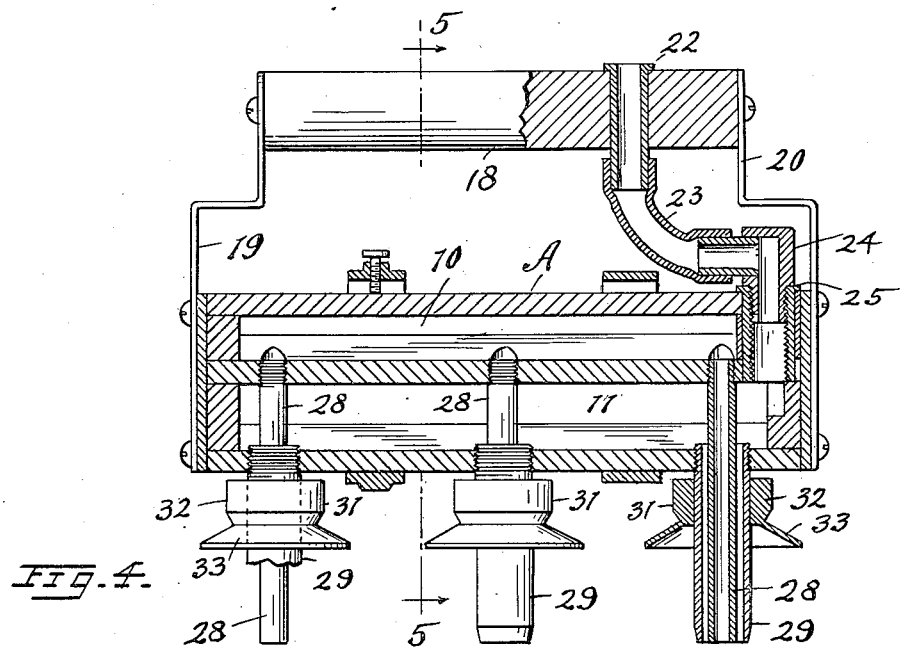
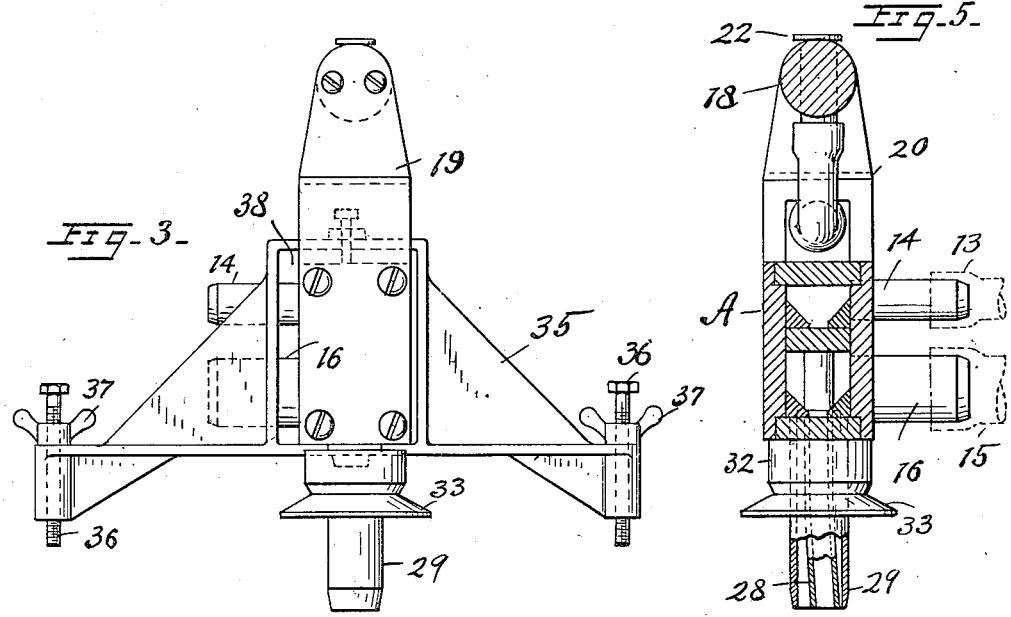

Patented May 1, 1934

1,956,968

UNITED STATES PATENT OFFICE 1,956,968

BATTERY FILLER

Frank Altmayer, Cleveland, and Arthur O. Codney, Cleveland Heights, Ohio, assignors to Willard Storage Battery Company, Cleveland, Ohio, a corporation of West Virginia Application October 29, 1932, Serial No. 640,233

15 Claims. (Cl. 226—116)

The present invention relates to battery filler systems such as used in filling batteries of the lead acid type with electrolyte, etc., and more particularly to a battery filler head to be used with a vacuum filling system.

The ordinary vacuum filling system comprises a vacuum pump, a reservoir containing liquid such as electrolyte, etc., an overflow collection jar set, a filler head set, and the necessary flexible tubing connecting the various units of the system in a manner well known in the art. The object of the present invention is the provision of a simplified and improved filler head to be used in such a system.

Other objects of the invention are the provision of a filler head of the type referred to which will be simple and rigid in construction and free from cracks or leaks, will quickly fill and accurately gauge the extent to which the cells are filled, and afford continuous observation of the operation thereof.

Other objects and advantages of the invention will be apparent to those skilled in the art from the following description of the preferred embodiment of the invention described with reference to the accompanying drawings, in which:

Fig. 1 is a front elevation of a battery filler head embodying the present invention in position upon a battery, the outline of which is shown in dotted lines.

Fig. 2 is a plan of the device shown in Fig. 1.

Fig. 3 is an end elevation of the device shown in Figs. 1 and 2, looking toward the left.

Fig. 4 is a section on the line 4—4 of Fig. 2 with portions in elevation and other portions broken away, and Fig. 5 is a section on the line 5—5 of Figs. 1 and 4.

Similar reference characters designate corresponding parts throughout the several views of the drawings.

Referring to the drawings, Fig. 1 shows a filler head in position upon a battery B of the lead acid type. Merely an outline of the battery is shown since it forms no part of the present invention and is illustrated only to assist in understanding the construction and operation of the filler head.

The filler head comprises a body portion designated in general by the reference character A provided with two manifolds or chambers 10 and 11 one above the other. The upper manifold or chamber 10 is the air or vacuum manifold and is, in operation, connected to the vacuum pump through the overflow collecting jar set, neither of which is shown, by the flexible tubing 13 attached to the nipple 14. The lower manifold or chamber 11 is the liquid manifold and is connected to the liquid reservoir, not shown, by the flexible tubing 15 attached to the nipple 16. A handle 18 connected to the body portion A by handle brackets 19 and 20, is provided with a vent opening in the form of a bushing 22 connected with the liquid manifold 11 through a flexible tube 23 and an elbow member 24 threaded into a bushing 25 secured in the body portion in any suitable manner and communicating with the liquid manifold.

The body portion A supports or carries a plurality of air and liquid stems 28 and 29, respectively, connected thereto and communicating with the air and liquid manifolds, respectively. The liquid stems are so spaced that they are adapted to be simultaneously inserted into the vent openings of the battery and the air stems are within the liquid stems. The stems are of sufficient length to project down into the battery cells to a point where the electrolyte or maximum filling height is intended to be. The arrangement is such that an air and a liquid stem project into each battery cell. The filler head illustrated is adapted for use with a three cell battery but it is to be understood that it may be adapted for any number of cells. Each liquid stem carries a vent seal 31 preferably made of gum rubber, comprising a collar member 32 provided with a thin flexible skirt or flange member 33, extending downwardly and outwardly and of sufficient diameter to completely cover the vent openings with which it makes contact while the filler is in position in the battery. The vent seals are held in position on the liquid stem 29 by their snug fit and are adjustable upward or downward therealong. Owing to the flexibility of the circularly shaped flange 33, the vent seals make a yielding contact with the vent openings and any unevenness of the covers, caused by one or more of the covers being lower, higher or tipped with respect to the others does not affect the proper sealing of the vent holes, as any variation is taken up by the flange which adjusts itself to such variation without leakage of air, etc. Because of the flexibility of the flange 33 the seal is also effected without the application of pressure, it being merely necessary to bring the same into contact with the upper edge of the vent opening, after which the vacuum occurring in the cell pulls the same down into contact with the vent opening.

The body portion A is provided with two frame members 35 adapted to rest upon the top of the battery and which constitute a liquid level gauge for gauging the height of the electrolyte, etc. The height of the assembly above the battery may be varied by adjustable legs in the form of gauge screws 36 threaded into the ends of the brackets 35 and held in adjusted position by wing nuts 37. The opening 38 in each of the brackets into which the filler body fits is made offset, so that the filler body may be located either centrally in the brackets to accommodate batteries having centrally located vent openings, or offset in the brackets to accommodate batteries which have offset vent openings. The brackets 35 gauge the filling height by means of the gauge screw 36, the lower ends of which rest upon the upper edge of the battery container at four points, and since there is no variation in the evenness of the upper edge of the battery container, the filling height is positively fixed in relation to the container being filled, and depends solely upon the setting of the gauge screws which may be easily and quickly adjusted to the desired filling height, and the brackets 35 further insure that the filler will be in the proper vertical position in relation to the battery being filled.

The various portions of the device, with the exception of the handle brackets, the vent seals and the flexible tubing, may be made of transparent material such as celluloid, permitting the quick location of any obstruction in the device and allowing continuous observation of the operation thereof. Where the body portion A is transparent it may be made up of assembled members previously formed or cut to shape and fastened together by any suitable means, which eliminates any possibility of cracks, etc., existing within the filler head, as might be the case if the body portion were molded. The manifolds 10 and 11 have square shaped sides and tops and V-shaped bottoms permitting maximum capacity of manifold with increased filling speed and improved drainage.

The operation of the device is as follows: The vacuum pump withdraws air from the upper manifold 10 which, in turn, withdraws air from the battery cells through the air stems 28. When the vent opening 22 in the handle 18 is closed by the operator placing his thumb thereon, admission of air to the cells is interrupted producing a vacuum therein which causes liquid or electrolyte to be drawn from the liquid reservoir into the liquid manifold 11 through the flexible tube 15 and the nipple 16, from whence it flows down the space between the inner and the outer stems 28 and 29 into the cell.

When the height of the liquid in the cell reaches the lower end of the inner or air stem, it can rise no farther, continued filling resulting in the excess liquid being drawn into the vacuum or air manifold 10, from whence it flows to the overflow collecting jar set through the tubing 13. When the operator observes liquid collecting in the over-flow collecting jar, he removes his thumb from the air vent, thereby destroying the vacuum in the cell and stopping the flow of liquid from the liquid reservoir to the liquid manifold and in turn to the cell. Part of the liquid in the manifold, when the vacuum is broken, flows or is siphoned back into the reservoir and the rest flows into the cell where it is withdrawn to the overflow jar set and the filler head may be removed without dripping. As stated above the filling height is determined by the position of the stems in the cells which is in turn determined by the position of the frame members 35, and may be adjusted by the gauge screws 36.

From the foregoing description of the preferred embodiment of the invention, it will be apparent that we have provided a filler head which will carry out the objects of the invention and which will perfectly fill a battery in a single operation, thus overcoming the results of imperfect filling, some of which are: insufficient electrolyte in one or more cells; necessity of refilling which causes loss of time, etc.; excessive filling causing overflow of cells during charging, and incorrect amount of electrolyte in one or more cells resulting in improper and/or uneven final specific gravity of cells.

The invention has been described with reference to the preferred embodiment thereof, but we do not wish to be limited to the particular construction illustrated and described, which may be varied within the scope of this invention, and we particularly point out and claim as our invention:

We claim:—

1. A vessel filling head comprising a body portion provided with a plurality of manifolds, a handle attached to said body portion and provided with a vent opening communicating with one of said manifolds, a plurality of tubular stems one within the other connected to said body portion and adapted to be inserted into a vessel, one of said stems communicating with one of said manifolds and another of said stems communicating with another of said manifolds, a vessel seal connected to the outer of said stems, and adjustable means adapted to support said body portion on the vessel to be filled.

2. A vessel filling head comprising a body portion provided with a plurality of manifolds, a handle attached to said body portion and provided with a vent opening communicating with one of said manifolds, a plurality of tubular stems one within the other connected to said body portion and adapted to be inserted into a vessel through an opening therein, one of said stems communicating with one of said manifolds and another of said stems communicating with another of said manifolds, and a vessel seal connected to the outer of said stems, said vessel seal comprising an outwardly and downwardly projecting flexible flange adapted to engage the edge of the opening through which the stems are projected.

3. A vessel filling head comprising a transparent body portion provided with a plurality of manifolds, a handle attached to said body portion and provided with a vent opening communicating with one of said manifolds, a plurality of tubular stems one within the other connected to said body portion and adapted to be inserted into a vessel to be filled, one of said stems communicating with one of said manifolds and another of said stems communicating with another of said manifolds, a vessel seal connected to the outer of said stems, and adjustable means adapted to support said body portion on a vessel to be filled.

4. A vessel filling head comprising a transparent celluloid body portion provided with a plurality of manifolds, a handle attached to said body portion and provided with a vent opening communicating with one of said manifolds, a plurality of tubular stems communicating with said manifolds connected to said body portion and adapted to be inserted into a vessel to be filled through an opening therein, and a vessel seal connected to one of said stems, said vessel seal comprising an outwardly and downwardly projecting flexible flange adapted to engage the edge of the opening in the vessel.

5. A vessel filling head comprising a body portion built up of preformed transparent celluloid members and provided with a plurality of manifolds, a handle attached to said body portion and provided with a vent opening communicating with one of said manifolds, a plurality of tubular stems communicating with said manifolds connected to said body portion and adapted to be inserted into a vessel through an opening therein, one of said stems being positioned within the other, and a vessel seal connected to the outer of said stems, said vessel seal comprising an outwardly and downwardly projecting flexible flange adapted to engage the edge of the opening in the vessel.

6. A vessel filling head comprising a bracket adapted to be supported upon a vessel, a body portion provided with a plurality of manifolds supported in said bracket, a handle attached to said body portion and provided with a vent opening communicating with one of said manifolds, a plurality of tubular stems one within the other connected to said body portion and adapted to be inserted into the vessel, one of said stems communicating with one of said manifolds and another of said stems communicating with another of said manifolds, and a vessel seal connected to the outer of said stems.

7. A vessel filling head comprising a bracket adapted to be supported upon a vessel, a body portion built up of preformed transparent celluloid members and provided with a plurality of manifolds, a handle attached to said body portion and provided with a vent opening communicating with one of said manifolds, a plurality of tubular stems communicating with said manifolds connected to said body portion and adapted to be inserted into the vessel to be filled, and a vessel seal connected to one of said stems.

8. A vessel filling head comprising a bracket adapted to be supported upon a vessel, a body portion built up of preformed transparent celluloid members and provided with a plurality of manifolds, a handle attached to said body portion and provided with a vent opening communicating with one of said manifolds, a plurality of tubular stems communicating with said manifolds connected to said body portion and adapted to be inserted into the vessel to be filled, one of said stems being positioned within the other, a vessel seal connected to the outer of said stems, and means for adjusting said bracket.

9. A vessel filling head comprising a frame provided with a plurality of manifolds, means for connecting one of said manifolds with a vacuum, means for connecting another of said manifolds to a liquid supply tank, a projection on said frame adapted to be inserted into a vessel and provided with a plurality of passageways communicating with said manifolds, a vessel seal, and adjustable means for supporting said frame on the vessel to be filled.

10. A vessel filling head comprising a frame provided with a plurality of manifolds, means for connecting one of said manifolds with a vacuum, means for connecting another of said manifolds to a liquid supply tank, a plurality of tubular stems communicating with said manifolds and connected to said frame, and adjustable means for supporting said frame on the vessel to be filled.

11. A vessel filling head comprising a body portion provided with a plurality of manifolds, a plurality of tubular stems one within the other connected to said body portion and communicating with said manifolds, a vessel seal, and means for supporting said body portion on the vessel to be filled.

12. A vessel filling head comprising a body portion provided with a plurality of manifolds, a vent opening communicating with one of said manifolds, a plurality of tubular stems one within the other connected to said body portion and communicating with said manifolds, a vessel seal supported by said stems, and means for supporting said body portion on the vessel to be filled.

13. A vessel filling head comprising a bracket adapted to be supported upon a vessel to be filled, a body portion provided with a plurality of manifolds supported by said bracket, means for connecting one of said manifolds with a vacuum, means for connecting another of said manifolds to a liquid supply tank, a vent opening communicating with the first of said manifolds, a plurality of tubular stems connected to said body portion and adapted to be inserted into the vessel to be filled, one of said stems communicating with one of said manifolds and another of said stems communicating with another of said manifolds.

14. A vessel filling head comprising a bracket adapted to be supported upon a vessel to be filled, a body portion provided with a plurality of manifolds adjustably supported in said bracket, a plurality of tubular stems one within the other connected to said body portion and adapted to be inserted into the vessel to be filled, one of said stems communicating with one of said manifolds, and another of said stems communicating with another of said manifolds, and a vessel seal connected to the outer of said stems.

15. A vessel filling head comprising a bracket adapted to be supported upon a vessel to be filled, a body portion provided with a plurality of manifolds adjustably supported in said bracket, a vent opening communicating with one of said manifolds, a plurality of groups of tubular stems one within the other connected to said body portion and adapted to be inserted into the vessel to be filled, one stem of each group communicating with one of said manifolds and another stem of each group communicating with another of said manifolds, and a vessel seal connected to the outer stem of each group.

FRANK ALTMAYER.
ARTHUR O. CODNEY.